July 17, 1934.  S. COHEN  1,966,919
VARIABLE CONDENSER
Original Filed March 16, 1932
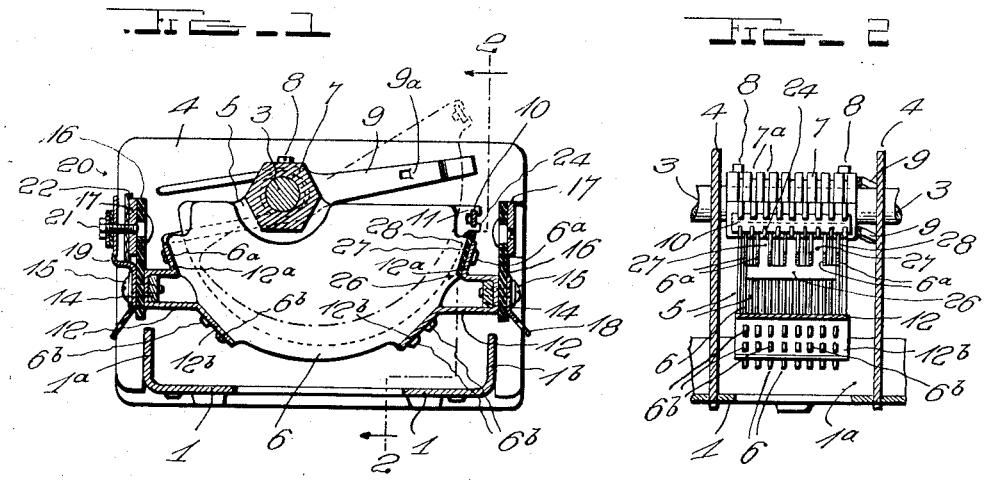
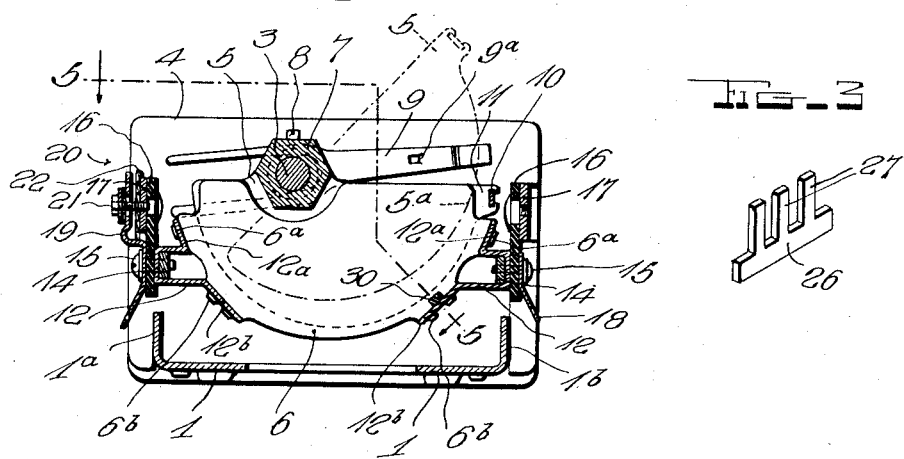
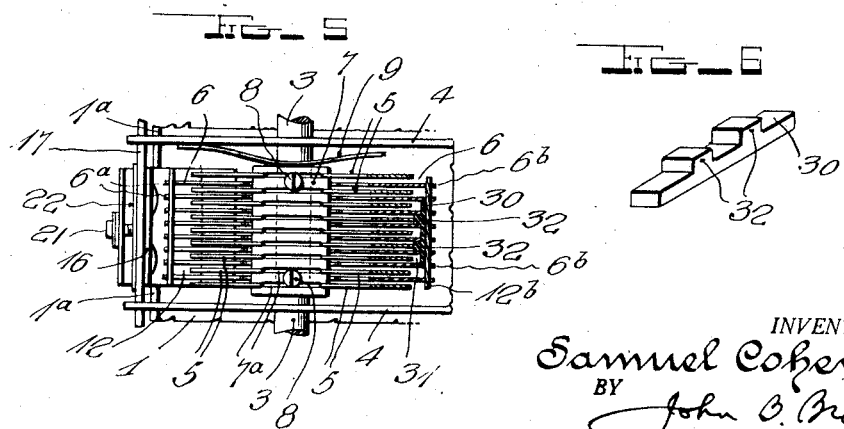
INVENTOR.
Samuel Cohen,
BY John O. Brady
ATTORNEY.

Patented July 17, 1934

1,966,919

UNITED STATES PATENT OFFICE 1,966,919

VARIABLE CONDENSER

Samuel Cohen, Brooklyn, N. Y., assignor to General Instrument Corporation, New York, N. Y., a corporation of New York Original application March 16, 1932, Serial No. 599,241. Divided and this application September 1, 1933, Serial No. 687,863

9 Claims. (Cl. 175—41.5)

My invention relates broadly to variable electrical condensers and more particularly to a construction of insulated limiting stop for controlling the movement of the rotor plates of the variable condenser with respect to the stator plates with which the rotor plates are arranged to be interleaved.

This application is a division of my application Serial No. 599,241, filed March 16, 1932, and entitled Variable condenser.

One of the objects of my invention is to provide a construction of variable condenser in which an insulated stop is carried adjacent the stator plates for abutment with a member carried by the rotor plates for limiting the relative interleaving movement of the rotor plates with respect to the stator plates.

Another object of my invention is to provide a construction of insulated stop arranged to be carried by the stator plates of a variable condenser in alignment with a member carried by the rotor plates for limiting the movement of the rotor plates with respect to the stator plates during the interleaving operation of said plates.

Still another object of my invention is to provide a construction of insulated abutment which may be readily inserted upon the stator unit of a variable condenser for providing a limiting stop for a member carried by the rotor plates for preventing rotation of the rotor plates with respect to the stator plates beyond a range of 180°.

A further object of my invention is to provide a construction of insulated stop supported by means embracing the opposite edges of a set of stator plates in a variable condenser for providing a limiting abutment for the edges of the rotor plates.

A still further object of my invention is to provide a construction of insulator which may be readily mounted on one of the flanges of a stator plate support for providing a limiting abutment for the coacting rotor plates.

Other and further objects of my invention reside in the construction of rotary variable condenser and limiting stop for determining the extent to which the rotor plates may be interleaved with respect to the stator plates as set forth more fully in the specification hereinafter following by reference to the accompanying drawing, in which:

Figure 1 is a cross-sectional view taken through one section of a multiple variable condenser and illustrating the arrangement of insulated stop carried by the stator unit for coaction with the rotor unit in accordance with my invention; Fig. 2 is a longitudinal cross-sectional view taken through the condenser section on line 2—2 of Fig. 1; Fig. 3 is a perspective view of the insulated stop which is carried by the stator support for the stator unit shown in Figs. 1 and 2; Fig. 4 shows a modified method of mounting the insulated stop for the rotor plates of the variable condenser in accordance with my invention; Fig. 5 is a sectional view through the condenser of Fig. 4 taken on line 5—5 thereof; and Fig. 6 is a perspective view of the modified form of insulated stop mounted upon the stator unit support illustrated in Figs. 4 and 5.

Referring to the drawing in more detail, reference character 1 designates the condenser chassis or cradle having upstanding side portion 1a and 1b. The cradle is provided with end plate members in which the rotor shaft 3 is journaled. Electrostatic shield plates 4 extend laterally of the condenser chassis and provide compartments within which the sections of the multiple variable condenser are arranged. Each section of the condenser includes a set of rotor plates 5 and a cooperating set of stator plates 6. The sets of rotor plates 5 are carried by the sleeve 7 located on the shaft 3 and is grooved as represented at 7a to receive the notched edges of the rotor plates 5 for securing the plates 5 in position for rotation in accordance with the movement of shaft 3. The sleeve 7 is secured in position on shaft 3 by means of set screw 8 which may be adjusted by means of a socket wrench or other tool. The sleeve 7 is subjected to frictional contact on the end thereof by means of resilient forked strip 9 which bears against the shield plate 4 at one side and against the end of sleeve 7 at the other side. The resilient forked strip 9 is secured with respect to the shield plate 4 by means of a lug 9a struck from the strip 9 and entering an aperture in the shield plate 4. The constant friction thus applied against the end of sleeve 7 enables the rotor shaft 3 to be moved with precision adjustment and maintained in any one of the positions to which the shaft is adjusted. The rotor plates 5 are keyed at one extremity thereof by means of a key strip 10 which engages oppositely disposed grooves 11 in the rotor plates 5. The key strip 10 has been shown disposed in a plane normal to the plane of the edges of the rotor plates 5.

The sets of plates 6 constituting the stator unit are supported from opposite ends thereof by means of channel shaped members 12 having oppositely extending angularly disposed portions 12a and 12b which serve as seats for lugs extending from the edges of the stator plates 6. These lugs have been designated at 6a and 6b extending through slots formed in the angularly disposed portions 12a and 12b of the channel shaped members 12, the lugs being upset to form a rigid connection between the stator plates 6 and the channel shaped supports 12. The channel shaped supports 12 each enclose a longitudinally extending member 14 which is screw threaded to receive the screw members 15 which pass through the lower portions of the insulated panels 16 which depend from the supporting frame members 17 which extend longitudinally of the condenser chassis. The suspension of the stator plates from the downwardly depending insulated panels 16 is such that the stator plates are centered within the condenser chassis and spaced away from the side walls thereof. A connecting lug 18 is secured under the head of one of the supporting screws 15 while the plate member 19 of the compensating condenser 20 is secured under the head of the opposite screw 15. The plate 19 is adjustable toward or away from the longitudinally extending frame member 17 by means of adjusting screw 21 which enters the frame member 17, passing through the dielectric sheet 22. Adjustment of the plate 19 toward or away from the longitudinally extending frame member 17 serves to adjust the capacity of the condensating condenser 20 in shunt with the stator and rotor plates constituting each condenser unit.

In order to prevent short-circuiting between the stator and rotor plates, I provide an insulated stop in the shape of a vertically extending comb 26 having upstanding tongues 27 substantially equal in width to the spaces between the stator plates enabling the comb 26 to extend upwardly between the stator plates 6 and beyond the edge portion 28 thereof providing a stop for the projecting portions 24 of the rotor plates. The length of the insulated prongs 27 is such that the projecting portions 24 of the rotor plates abut with the insulated prongs 27 before movement of the rotor plates to such a position that short circuit could occur between the rotor and stator plates. The insulated stop 26 is so shaped that the stop can be supported directly against the angularly disposed portion 12a of the channel shaped member 12 which serves as the support for one end of the stator unit. The insulated stop 26 has one plane surface thereof in direct contact with the angularly disposed portion 12a of the channel shaped member 12.

By reference to Figs. 1 and 2, it will be observed that the lugs 6a which pass through slots in the angularly disposed portion 12a over the channel shaped member 12 occupy but a small portion of the total width of the edge portion 28 of each stator plate. This permits the comb 26 to be wedged between the edge of the lower part of the edge portion 28 and the angularly disposed portion 12a of the channel shaped member 12 with the prongs 27 thereon extending upwardly in the spaces between the stator plate 6 and beyond the edge portion 28 for forming the insulated stop heretofore described. That is to say, the horizontally extending portion of the comb 26 is wedged between the lower edge of the edge portion 28 directly beneath the lugs 6a and against the inner face of the angularly disposed portion 12a of the channel shaped member 12 while the prongs 27 extend between the stator plates 6. This arrangement is shown more fully in Fig. 2.

In Figs. 4, 5 and 6, I have shown a further construction of insulated stop arranged in accordance with my invention wherein the strip of insulation material 30 extends through grooves 31 cut in certain of the stator plates 6 and provides an insulated abutment for the curved edges 5a of the rotor plates 5. The strip of insulation material 30 has a pair of upstanding lugs 32 thereon of a width sufficient to extend between the adjacent stator plates 6 for maintaining said plates in spaced relation and also providing stops for the edges of the rotor plates in the course of movement of the rotor plates into interleaving relation with the stator plates. The abutment of the edges of the rotor plates with the projections 32 of insulation strip 30 is such as to limit the further movement of the rotor plates with respect to the stator plates.

I have found that the mounting of the insulated strip of selected parts of the stator plates provides an inexpensive and practical method of insulating the rotor plates with respect to the stator plates at the same time producing minimum dielectric losses.

While I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. In a variable condenser, a frame structure, a set of stator plates, means for supporting said stator plates laterally of said frame structure, said means embracing portions of the peripheral edges of said stator plates, a set of rotor plates, means for variably interleaving said rotor plates with said stator plates, a key member for maintaining said rotor plates in predetermined spaced relation, and a comb-like insulated strip supported by the means embracing the edges of said stator plates and having prongs projecting therefrom between adjacent stator plates for providing abutments for the edges of said rotor plates and limiting the extent to which said rotor and stator plates are interleaved.

2. In a variable condenser including sets of interleaved stator and rotor plates, a key member connecting the remote edges of the rotor plates in predetermined spacial relation, an insulated stop comprising a multiprong comb projecting between said stator plates, and means on said rotor plates adapted to abut with the extremities of the multiprong comb constituting the insulated stop for limiting the movement of said rotor plates in one extreme position and preventing electrical contact between said key member and said stator plates.

3. In a variable condenser, a set of stator plates, a set of rotor plates, means for variably interleaving said rotor plates with respect to said stator plates, a projection formed on said rotor plates, a key member extending through said projection and maintaining said rotor plates in predetermined spacial relation, and a comb-like insulator comprising a multiplicity of tongues extending from an insulated bar, said tongues projecting between the spaced stator plates and beyond the peripheral edges thereof for providing an insulated abutment for the projection on said rotor plates and preventing electrical contact between said key members and the edges of said stator plates.

4. In a variable condenser including sets of interleaved stator and rotor plates, a key member for securing the remote edges of the rotor plates in predetermined spacial relation, a channel shaped member for supporting the edges of said stator plates, said channel shaped member including a slotted portion constituted by a plane area, lugs on the extreme edges of said stator plates extending through the slotted plane area of said channel shaped member, an insulated strip wedged between the edge of said stator plates and the surface of said plane area, said insulated strip projecting beyond the edge of said stator plates and forming an insulated stop for said rotor plates when interleaved with said stator plates in one extreme position and preventing electrical contact between said key member and said stator plates.

5. In a variable condenser including sets of interleaved stator and rotor plates, a key member for securing the remote edges of the rotor plates in predetermined spacial relation, a channel shaped member for supporting the edges of said stator plates, said channel shaped member including a slotted portion constituted by a plane area, lugs on the extreme edges of said stator plates extending through the slotted plane area of said channel shaped member, a flat comb shaped insulator including a plurality of prongs, said insulator having one surface thereof lying in contact with the said plane area of said channel shaped member with the prongs thereon projecting between said stator plates and beyond the edges thereof and forming an insulated stop for said rotor plates when interleaved with said stator plates in one extreme position and preventing electrical contact between said key member and said stator plates.

6. In a variable condenser including sets of interleaved stator and rotor plates, a key member for securing the remote edges of the rotor plates in predetermined spacial relation, a channel shaped member for supporting the edges of said stator plates, said channel shaped member including upper and lower flange extensions disposed at an angle with respect thereto, each of said extensions being slotted to receive lugs projecting from the edges of said stator plates, an insulated strip wedged between lugs extending through the lower flange extension of said channel shaped member and edges of said stator plates, and means on said strip for forming an insulated stop for said rotor plates when interleaved with said stator plates in one extreme position and preventing electrical contact between said key member and said stator plates.

7. In a variable condenser including sets of interleaved stator and rotor plates, a key member for securing the remote edges of the rotor plates in predetermined spacial relation, a channel shaped member for supporting the edges of said stator plates, said channel shaped member having oppositely directed slotted flanges thereon, said slotted flanges each receiving lugs projecting from the edges of said stator plates, and an insulated strip wedged between the edges of said stator plates immediately adjacent the lugs thereon and one surface of one of the slotted flanges on said channel shaped member, said strip projecting beyond the edges of said stator plates and forming an insulated stop for said rotor plates when interleaved with said stator plates in one extreme position and preventing electrical contact between said key member and said stator plates.

8. In a variable condenser, a frame structure, a rotary shaft journaled in said frame structure, a set of rotor plates movable in accordance with the movement of said shaft, a set of stator plates supported by said frame structure in a position whereby the rotor plates may be variably interleaved therewith, a multiplicity of interconnected insulated stops extending between said stator plates, a key member for securing the remote edge of said rotor plates in predetermined spacial relation and a projection on said rotor plates adapted to abut against the insulated stops which extend between said stator plates for preventing contact between said key member and said stator plates and preventing short-circuiting between said rotor and stator plates when said rotor plates are moved to an extreme interleaved position with respect to said stator plates.

9. In a variable condenser, a set of stator plates, a set of rotor plates, means for variably interleaving said rotor plates with respect to said stator plates, a projection formed on said rotor plates, a key member extending through said projection and maintaining said rotor plates in predetermined spaced relation, and a comb-like insulator having portions thereof projecting between said stator plates and a portion thereof extending beyond the edges of said stator plates for establishing an insulated stop against which the said projection on said rotor plates is adapted to abut for preventing electrical contact between said key member and said stator plates.

SAMUEL COHEN.